United States Patent
Zhu et al.

(10) Patent No.: US 10,205,498 B2
(45) Date of Patent: Feb. 12, 2019

(54) USER EQUIPMENT AND CODEBOOK SEARCH METHOD FOR 4TX DUAL CODEBOOK (RAN1)

(71) Applicant: Intel IP Corporation, Santa Clara, CA (US)

(72) Inventors: Yuan Zhu, Beijing (CN); Yang Tang, Pleasanton, CA (US); Jiacheng Wang, Chaoyang (CN); Ismael Gutierrez, San Jose, CA (US); Yeong-Sun Hwang, Oberhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/575,226

(22) PCT Filed: Jun. 25, 2015

(86) PCT No.: PCT/CN2015/082363
§ 371 (c)(1),
(2) Date: Nov. 17, 2017

(87) PCT Pub. No.: WO2016/206052
PCT Pub. Date: Dec. 29, 2016

(65) Prior Publication Data
US 2018/0167115 A1    Jun. 14, 2018

(51) Int. Cl.
*H04B 7/0456* (2017.01)
*H04B 7/06* (2006.01)

(52) U.S. Cl.
CPC ........... *H04B 7/0478* (2013.01); *H04B 7/065* (2013.01); *H04B 7/0695* (2013.01); *H04B 7/0639* (2013.01)

(58) Field of Classification Search
CPC .................................................. H04B 7/0478
(Continued)

(56) References Cited

U.S. PATENT DOCUMENTS

2003/0189515 A1* 10/2003 Jacomb-Hood ........ H01Q 1/288
    342/373
2010/0273499 A1* 10/2010 van Rensburg ... H04W 72/1231
    455/450
(Continued)

FOREIGN PATENT DOCUMENTS

| WO | WO-2014126992 A2 | 8/2014 |
|----|-------------------|--------|
| WO | WO-2014193718 A1 | 12/2014 |
| WO | WO-2016206052 A1 | 12/2016 |

OTHER PUBLICATIONS

"International Application Serial No. PCT/CN2015/082363, International Search Report dated Mar. 15, 2016", 4 pgs.

(Continued)

*Primary Examiner* — Lihong Yu
(74) *Attorney, Agent, or Firm* — Schwegman Lundberg & Woessner, P.A.

(57) ABSTRACT

An enhanced Node B (eNB) for precoding is generally described. In some embodiments, a first precoding-matrix indicator (PMI) and a second PMI is received on an uplink channel from user equipment (UE). Symbols for multiple-input multiple output (MIMO) beamforming may be precoded by the eNB using a precoder matrix recommended by the first and second PMIs, for a MIMO downlink orthogonal frequency division multiple access (OFDMA) transmission. The first PMI and the second PMI are calculated by selecting a representative codeword that is indexed by i1 and i2 for a plurality of 2TX constituent beams, the 2TX constituent beam that provides the best system evaluation metric. The i1 index for wideband and the i2 index for each subband are identified from the defined 2TX constituent beam.

22 Claims, 5 Drawing Sheets

(58) Field of Classification Search
USPC .......................................................... 375/267
See application file for complete search history.

(56) References Cited

U.S. PATENT DOCUMENTS

2012/0113830 A1* 5/2012 Zhu .................... H04B 7/024
 370/252
2013/0156125 A1* 6/2013 Ko ..................... H04B 7/0478
 375/267

OTHER PUBLICATIONS

"International Application Serial No. PCT/CN2015/082363, Written Opinion dated Mar. 15, 2016", 4 pgs.
Qualcomm Incorporated, "Design and configuration of the enhanced 4TX codebook for ranks 1 and 2", 3GPP Draft; R1-132482 Design and Configuration of Enhanced 4TX Codebook for Rank 1 and 2, 3rd Generation Partnership Project (3GPP), Mobile Competence Centre; 650, Route Des Lucioles ; F-06921 Sophia, vol. RAN WG1, No. Fukuoka, Japan, Retrieved from the Internet: <UR:http://www.3gpp.org/ftp/tsgran/WG1RL1/TSGR173/Docs/> [retrieved on May 11, 2013], (May 11, 2013), 6 pgs.

* cited by examiner

USER EQUIPMENT AND CODEBOOK SEARCH METHOD FOR 4TX DUAL CODEBOOK (RAN1)

CROSS-REFERENCE TO RELATED APPLICATION

This application is a U.S. National Stage Filing under 35 U.S.C. 371 from International Application No. PCT/CN2015/082363, filed on Jun. 25, 2015, and published as WO 2016/206052 on Dec. 29, 2016, which application is incorporated herein by reference in its entirety.

TECHNICAL FIELD

Embodiments pertain to wireless communications. Some embodiments relate to precoding Matrix Indicator (PMI) search for a four transmit antenna (4Tx) dual codebook for multiple-input multiple output (MIMO) for reporting modes of the physical uplink control channel (PUCCH) and the physical uplink shared channel (PUSCH) of the Evolved Universal Terrestrial Radio Access Network (E-UTRAN), known as the Long Term Evolution and referred to as LTE.

Some embodiments relate to PMI generation for the PUSCH configured for reporting mode 3-2 of LTE Release 12 (known as LTE Advanced).

BACKGROUND

Fourth-Generation (4G) communication systems, such as LTE networks, use closed-loop beamforming techniques to improve throughput. In these systems, a receiver feeds back, among other things, precoding information, to a transmitter that recommends a precoder for use in transmitting beamformed signals back to the receiver. Since the selection of precoders is limited to particular codebooks, the recommended precoder may not be ideal based on the current channel conditions. MU-MIMO transmissions are particularly sensitive to this problem for a given codebook. Although errors from this problem may be reduced through the use of a larger codebook, recommending a precoder associated with a larger codebook would require significant additional feedback as well as defining a larger codebook. Additionally, the time and resources required to generate a PMI may be burdensome.

Thus, what are needed are systems and methods for precoding that reduce error without the use of a larger codebook. What are also needed are systems and methods for precoding that reduce channel state information (CSI) quantization error suitable for MU-MIMO in LTE networks. Further, an efficient way of generating a PMI quickly and with affordable use of resources is also needed.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
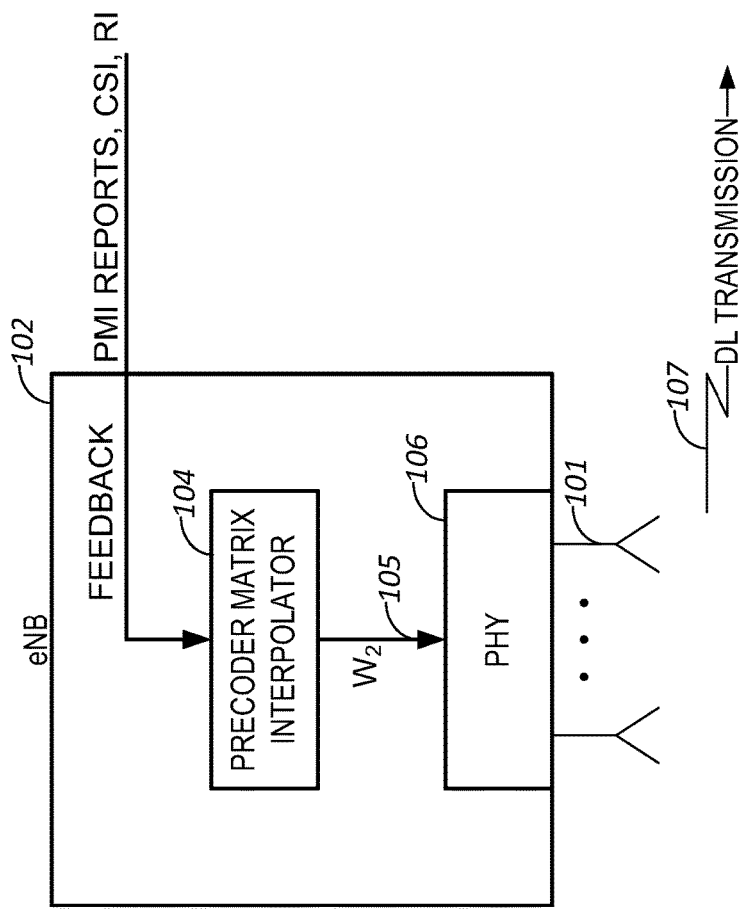
FIG. 1 is a functional diagram of enhanced node-B (eNB) in accordance with some embodiments.

FIG. 1 is a functional diagram of enhanced node-B (eNB) in accordance with some embodiments. The eNB 102 may be configured to receive first and second precoding-matrix indicator (PMI) reports PMI REPORTS CSI, RI on an uplink channel from user equipment (UE), and compute a precoder matrix ($W_2$) 105 from both the first and the second PMI reports. The eNB 102 may also be configured to precode symbols for MIMO beamforming using the computed single subband precoder matrix 105, which may be a single subband precoder matrix, for downlink transmission to the UE within a subband. Each of the first and the second PMI reports includes a PMI associated with a same subband (SB). The first PMI report may include a first subband PMI and the second PMI report may include a second subband PMI. In these embodiments, the use of two PMIs associated with the same subband may help reduce quantization error without having to significantly increase the feedback overhead for a larger new codebook. These embodiments are described in more detail below.

As illustrated in FIG. 1, the eNB 102 may include, among other thing, a precoder matrix interpolator 104 to generate an interpolated precoding matrix corresponding to the single subband precoder matrix 105 computed from PMI report REPORTS CSI, RI. In some embodiments a first PMI and a second PMI may be generated. Efficient generation of a PMI is described in more detail below. The eNB 102 may also include physical layer (PHY) circuitry 106 to precode symbols for beamforming for the downlink (DL) transmission 107. The eNB 102 may also include two or more antennas 101 for MIMO as well as MU-MIMO communications. In some embodiments, the MIMO transmission may be transmission on a physical downlink shared channel (PDSCH).

Figure 2:
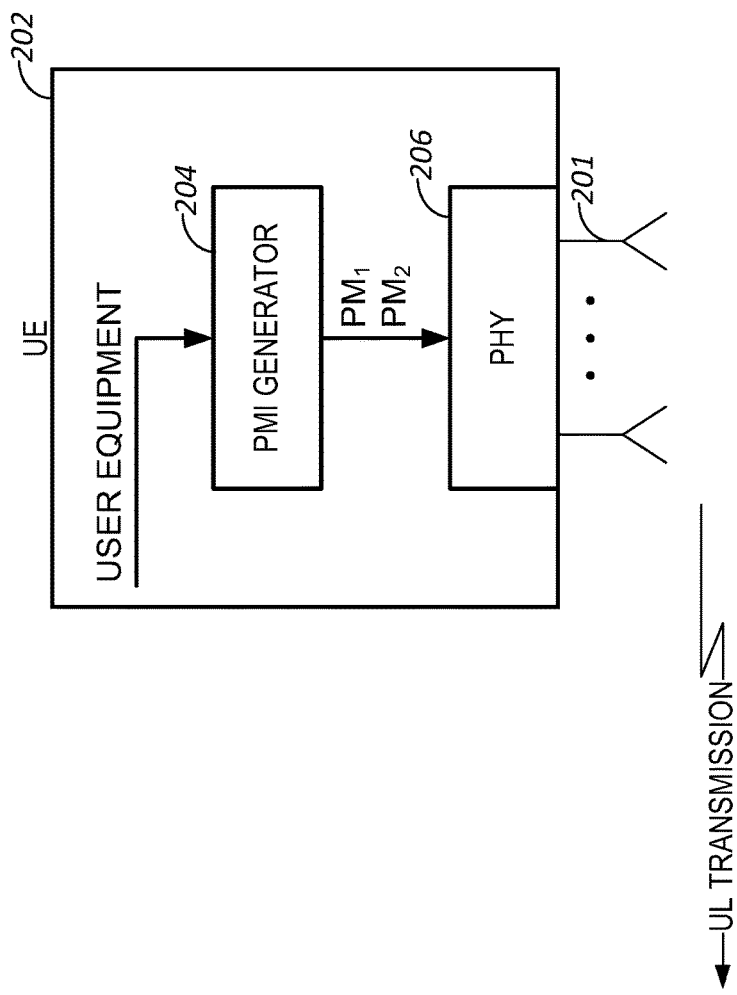
FIG. 2 is a functional block diagram of user equipment (UE) in accordance with some embodiments.

FIG. 2 is a functional block diagram of user equipment (UE) 202 in accordance with some embodiments. The UE 202 may include a PMI generator 204 configured to select the first and second PMIs based on channel conditions within a particular subband, and physical-layer circuitry (PHY) 206 to transmit the PMI reports 103 (FIG. 1) to the eNB 102 (FIG. 1). Each PMI in the PMI reports 103 may be associated with a precoder matrix. The UE 202 may also include two or more antennas 201 for MIMO communications as well as for the receipt of MU-MIMO communications.

In accordance with some embodiments, the second subband PMI is selected by the UE 202 after selecting the first subband PMI by searching candidate precoder matrices that, when combined with a precoder matrix indicated by the first subband PMI, result in a more accurate precoder for the subband. In other words, the use of the computed single subband precoder matrix 105 by the eNB 102 results in a more accurate precoder for the subband than the precoder resulting from use of precoder matrix indicated by the first subband PMI by itself. In some embodiments, the UE 202 may generate candidate single interpolated subband precoder matrices by combining the first precoder matrix with candidate second precoder matrices to identify a selected second precoder matrix that, when combined with the first precoder matrix, results in a single interpolated subband precoder matrix that provides a maximum reduction in quantization error when used by the eNB 102 for precoding transmissions to the UE 202.

A subband may be one resource block (RB) that comprises a set of subcarriers (e.g., twelve subcarriers), although this is not a requirement. In some embodiments, the first subband PMI and the second subband PMI may both be selected by the UE 202 from a table depending on the transmission rank.

In some embodiments, the UE 202 selects a first precoder matrix for the first subband PMI from a set of precoder matrices defined by a codebook to maximize throughput based on a channel transfer function associated with the subband. The UE 202 selects a second precoder matrix for the second subband PMI so that the interpolated precoder matrix computed from both the first subband PMI and the second subband PMI reduces quantization error that would result from use of the precoder matrix indicated by the first subband PMI alone.

In these embodiments, single subband precoder matrix that is computed from both the first subband PMI and the second subband PMI is a recommended precoding matrix (i.e., recommended by the UE 202 to the eNB 102). Although the precoder matrix indicated by the first subband PMI may be selected to maximize throughput, the use of this precoder matrix may result in a quantization error that may be large depending on the differences between an optimum precoder and the precoder associated with the first subband PMI.

Figure 3:
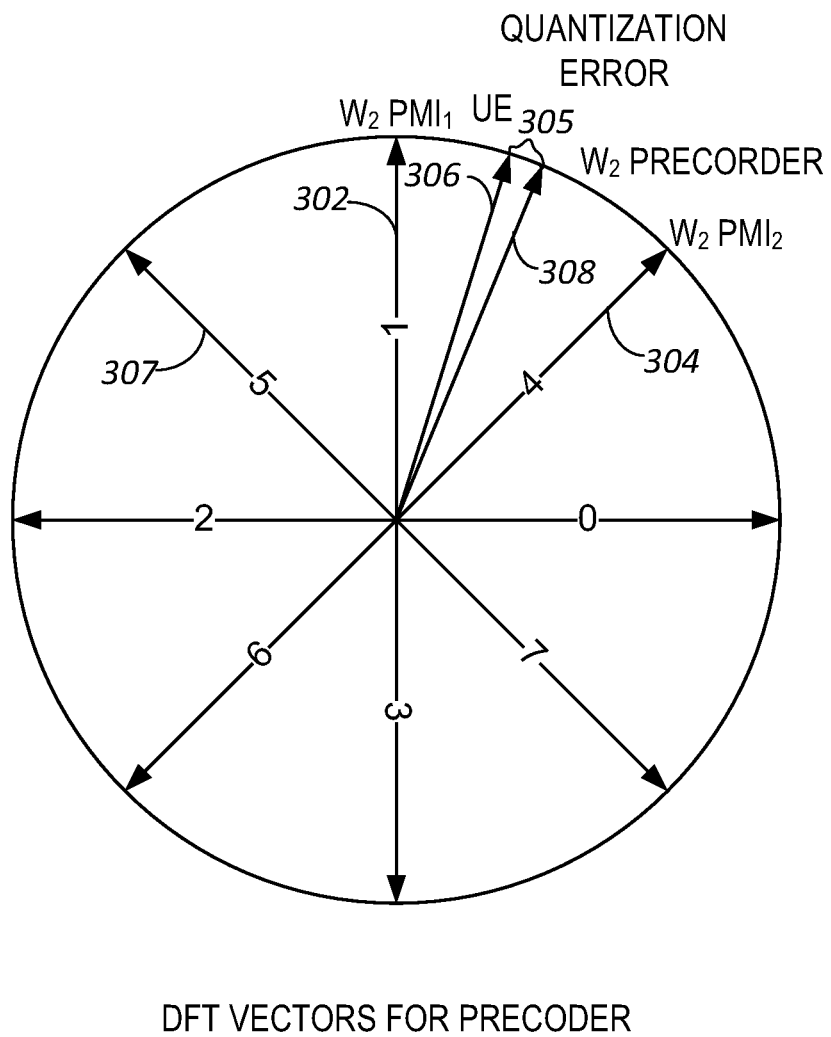
FIG. 3 is a flow chart of a procedure for generating and reporting first and second precoding matrix indicators (PMIs) in accordance with some embodiments.

FIG. 3 illustrates Discrete Fourier Transform (DFT) vectors associated with precoding matrices in accordance with some embodiments. As illustrated in FIG. 3, DFT vector 306 may be associated with an optimum precoder for the subband and DFT vector 302 may be associated with the precoder associated with the first subband PMI ($W_2$). The difference between DFT vectors 302 and 306 may correspond to the quantization error that would result without the use of the second subband PMI. DFT vector 304 may be associated with the second subband PMI, and DFT vector 308 may be associated with the interpolated single subband precoder matrix computed from both the first subband PMI and the second subband PMI. As a result, the quantization error may be reduced to the difference between DFT vectors 306 and 308, resulting in reduced quantization error 305.

In some embodiments, the first PMI report includes a subband PMI, and the second PMI report includes a subband differential PMI. The subband PMI may be an index corresponding to a recommended precoder based on channel characteristics of the subband. The subband differential PMI may be an index to indicate a difference between the recommended precoder and channel characteristics of the subband. In these embodiments, the subband differential PMI may be based on a quantization error related to a difference between a DFT vector associated with the subband PMI and channel characteristics of the subband.

In some embodiments, the first PMI report includes a first subband PMI and the second PMI report includes a second subband PMI. The first and second subband PMIs may be selected by the UE 202 to jointly describe the same subband of the channel. The first subband PMI and the second subband PMI correspond to precoding matrices selected by the UE 202 from a same codebook.

In some embodiments, the first and second PMI reports 103 are received from the UE 202 by the eNB 102 on a physical uplink control channel (PUCCH) within either a same subband-report subframe or a different subband-report subframe. In these embodiments, the PUCCH may be configured in accordance with the Third Generation Partnership Project (3GPP) TS 36.213 V10.0 (referred to as LTE release 10). Depending on the PUCCH format being used, the first and second PMI reports 103 may be received in the same subband-report subframe or a different subband-report subframe. In some other embodiments, the first and second PMI reports 103 may be received on a physical uplink shared channel (PUSCH).

In some embodiments, the first PMI report may be a wideband PMI report and the second PMI report is a subband PMI report. In these embodiments, the wideband PMI report and the subband PMI report may correspond to the wideband PMI report and the subband PMI report as defined in LTE release 10; however, both the wideband PMI report and the subband PMI report in accordance with some embodiments include a PMI describing the same subband. In these embodiments, both of the PMIs relate to the same subband and may be used by the eNB 102 to determine an interpolated precoder matrix for a single subband.

In some embodiments, the codebook used by the UE 202 for selecting both the first and second subband PMIs is a four transmit (4TX) antenna codebook, and the first and second PMI reports 103 are reported in accordance with an eight transmit (8TX) antenna reporting mode (e.g., for PUCCH 2-1). In these embodiments, the 4TX codebook may be the 4TX codebook of LTE release 8 and the first and second PMI reports 103 may be reported in accordance with the 8TX codebook of LTE release 10 on the PUCCH in format 2-1 (i.e., PUCCH 2-1).

In some embodiments, the single subband precoder matrix (i.e., the interpolated precoding matrix) may be computed by performing an interpolation on corresponding vectors of precoder matrices indicated by the first subband PMI and the second subband PMI. The interpolation may include weighting and combining the corresponding vectors of the precoder matrices to generate an interpolated precoding matrix.

In some embodiments, the precoder matrices indicated by the first subband PMI and the second subband PMI are weighted equally. In other embodiments, the precoder matrices indicated by the first subband PMI and the second subband PMI may be weighted differently. The interpolation procedure and the weighting may be predetermined and known by both the UE 202 and the eNB 102. In some embodiments, the weighting may be indicated by the UE 202 and reported along with the first and second PMI reports 103.

In some embodiments, the first subband PMI and the second subband PMI correspond to precoding matrices selected from the same codebook. The codebook may consist of a number of DFT vectors and a number of non-DFT vectors, such as those illustrated in FIG. 3. When both the first and second PMIs indicate DFT vectors, the DFT phase of the interpolated precoding matrix is generated from a weighted average of the DFT phases of the DFT vectors. On the other hand, when either the first or the second PMI does not indicate a DFT vector, each element of the vectors of the interpolated precoding matrix is generated from a weighted average of phases of corresponding elements of the DFT vectors.

In these embodiments, when both the first and second PMIs indicate DFT vectors, vectors of the interpolated precoding matrix may comprise DFT vectors. When either the first and second PMIs do not indicate a DFT vector, the vectors of the interpolated precoding matrix are not necessarily DFT vectors.

In these embodiments, when both the first and second PMIs indicate DFT vectors, each DFT vector can be uniquely defined by one phase. The phase of the interpolated DFT vector is a weighted average of the two phases of the two DFT vectors indicated by the first and second subband PMIs.

On the other hand, for a transmission of rank one, if any precoder vector associated with the first and second PMIs is not a DFT vector, then each element of the interpolated precoder is generated from a weighted average of the phases of the same element of both precoders. When both of the PMIs do not indicate DFT vectors (i.e., either PMI may indicate a non-DFT vector), each element of the interpolated precoder will be a weighted average of the phases of the same element of both precoding matrices (i.e., the precoding matrices indicated by the first and second subband PMIs).

For a transmission of rank two, the first column of the interpolated precoder will be interpolated using the first column of two precoders. The second column of the interpolated precoder is partially interpolated from the second column of the two precoders and partially calculated to ensure the two columns of the interpolated precoder are orthogonal to each other. A transmission of rank two may be a two-layer transmission on two antenna ports. A transmission of rank two may use a precoding matrix having two precoding vectors. A transmission of rank one, on the other hand, may be a single-layer transmission on a single antenna port and may use a precoding matrix having a single precoding vector. These embodiments are discussed in more detail below.

In some embodiments, the precoding performed by the eNB 102 may comprise multiplying symbols by the interpolated precoding matrix (i.e., the single subband precoder matrix 105) to generate an orthogonal frequency division multiple access (OFDMA) transmission. In MU-MIMO embodiments, the OFDMA transmission may be precoded for transmission to a plurality of UEs using the computed single subband precoder matrix generated by interpolation for each UE. In these embodiments, each UE may recommend an interpolated precoder matrix with first and second PMI reports that relate to a single subband.

Although embodiments are described herein in which the UE 202 generates the first and second PMI reports 103 for transmission to the eNB 102 to allow the eNB 102 to precode signals for transmission, the scope of the embodiments is not limited in this respect. In other embodiments, the eNB 102 may generate first and second PMI reports 103 for transmission to the UE 202 to allow the UE 202 to precode signals for transmission to the eNB 102.

In some embodiments in which the PUSCH is configured for reporting mode 3-2 (PUSCH 3-2), two PMI reports may be provided for every two consecutive subbands of a plurality of N subbands. In these embodiments, a single precoding matrix for each subband may be generated by interpolating the precoding matrices indicated by the two PMIs for each subband. In some of these PUSCH 3-2 embodiments, one wideband PMI may be provided for every N subbands and one subband PMI may be provided for each subband. The single precoding matrix may be computed for each subband based on the wideband PMI and the subband PMI for the associated subband. Various PUSCH 3-2 embodiments are discussed in more detail below.

PMI Based on Two Matrices and a 4TX Dual Codebook

Figure 4:
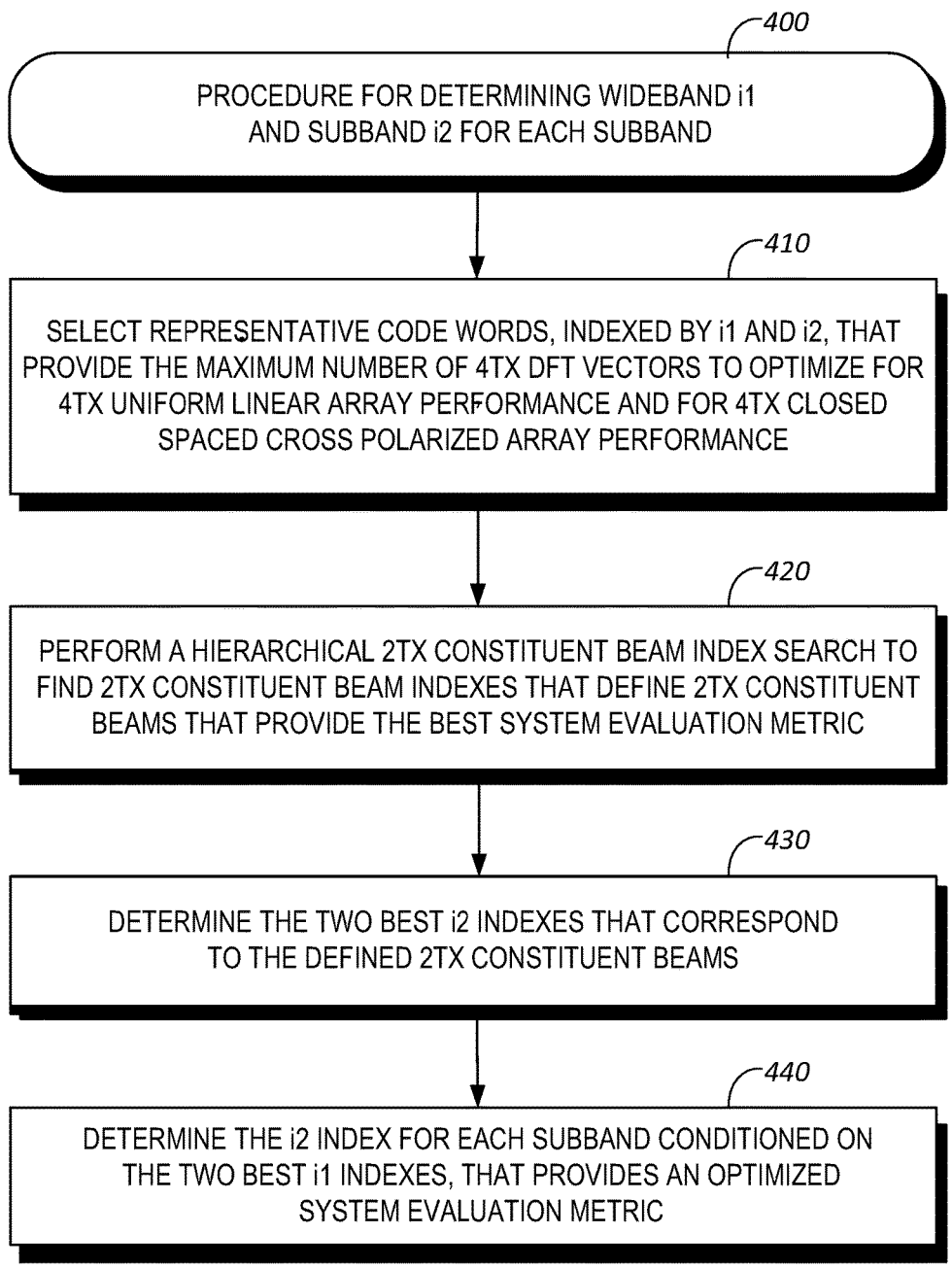
FIG. 4 is a flowchart of a procedure for generating and reporting PMIs in accordance with some embodiments.

FIG. 4 is a flowchart of a procedure for generating and reporting PMIs in accordance with some embodiments. LTE Release-12 has a 4TX dual codebook model. The precoder for the eNB is based on two matrices, $W_1$ and $W_2$, and is used to precode layers for eNB antenna transmission. eNB antennas, in some embodiments, transmit information via layers that comprise grids of 2TX constituent beams. A PMI is calculated at the UE and then transmitted to the eNB where it is received and used by the precoder at the eNB to precode the afore-mentioned grids for transmission. The PMI comprises two PMI components, $PMI^{i1}$ and $PMI^{i2}$. As will be discussed below, $PMI^{i1}$ is described in terms of a block diagonal matrix $W_1(i1)$ and $PM^{i2}$ is described in terms of matrix $W_2(i2)$. The procedure for generating and reporting PMIs illustrated in FIG. 4 includes, at 400, a procedure that comprises determining (which may be referred to in some instances herein as identifying) a wideband i1 and a subband i2 for each subband in which information is transmitted by the eNB. The procedure is performed by the UE (e.g., UE 202). At 410, the UE selects representative codewords that are indexed by i1 and i2. The selected codewords include a sufficient number, in some cases a maximum number, of 4Tx DFT vectors to optimize eNB information transmission for 4Tx uniform linear antenna array performance and for 4Tx close space cross polarized antenna array performance. At 420 the UE performs a hierarchical code book hierarchical constituent beam index search to find constituent beam indexes that define 2Tx constituent beams that provide an optimized system evaluation metric. The evaluation metric can be system throughput or another desirable metric. In some embodiments the optimization is provided by the codeword having sufficient, or the maximum number of, 4Tx DFT vectors. At 430 the two best i2 indexes that correspond to the defined 2TX constituent beam is selected. At 440, the i2 index for each subband is determined, conditioned on the best two i1 indexes, wherein the i2 index provides an optimized (or best) system evaluation metric. The indexes i1 and i2 are reported back to the eNB.

The PMI comprises two PMI components, $PMI^{i1}$ and $PMI^{i2}$. Some embodiments relate to how these two PMI components are calculated. In one embodiment optimized calculation can be based on pseudo code set forth below. Other embodiments relate to an efficient, simplified, lower complexity codeword search algorithm because the calculation based on the pseudo code below may be costly in time and resources, and therefore unaffordable.

In additional detail to the foregoing, in LTE Release-12 one new 4Tx codebook is standardized using a dual code book structure. One precoder is designed as the product of two matrices:

$$P(i1,i2) = W_1(i1)W_2(i1) \qquad (1)$$

where the first matrix is a block diagonal matrix:

$$W_1(i1) = \begin{bmatrix} X(i1) & 0 \\ 0 & X(i1) \end{bmatrix}, \text{ where } i1 = 0, 1, 2, \ldots, 15 \qquad (2)$$

and:

$$X(i1) = \begin{bmatrix} 1 & 1 & 1 & 1 \\ q_1^{i1} & q_1^{i1+8} & q_1^{i1+16} & q_1^{i1+24} \end{bmatrix} \text{ where } q_1 = e^{j2\pi/32} \qquad (3)$$

For a rank one precoder, the second matrix $W_2(i2)$ is:

$$W_2(i2) \in \left\{ \frac{1}{2}\begin{bmatrix} Y \\ \alpha(i)Y \end{bmatrix}, \frac{1}{2}\begin{bmatrix} Y \\ j\alpha(i)Y \end{bmatrix}, \frac{1}{2}\begin{bmatrix} Y \\ -\alpha(i)Y \end{bmatrix}, \frac{1}{2}\begin{bmatrix} Y \\ -j\alpha(i)Y \end{bmatrix} \right\} \qquad (4)$$

where $Y = e_i \in \{e_1, e_2, e_3, e_4\}$ and $\alpha(i) = q_1^{2(i-1)}$.

For rank two precoder, the second matrix $W_2(i2)$ is:

$$W_2(i2) \in \left\{ \frac{1}{2\sqrt{2}}\begin{bmatrix} Y_1 & Y_2 \\ Y_1 & -Y_2 \end{bmatrix}, \frac{1}{2\sqrt{2}}\begin{bmatrix} Y_1 & Y_2 \\ jY_1 & -jY_2 \end{bmatrix} \right\} \qquad (5)$$

where $(Y_1, Y_2) = (e_i, e_k) \in \{(e_1, e_1), (e_2, e_2), (e_3, e_3), (e_4, e_4), (e_1, e_2), (e_2, e_3), (e_1, e_4), (e_2, e_4)\}$ In the earlier LTE 8Tx dual codebook, the grid of beams defined by the W1 matrix is closely spaced instead of widely spaced as in the newer LTE Release-12 4Tx dual codebook. The W1 matrix of earlier 8Tx dual codebook is as equation (6).

$$X(i1) = \begin{bmatrix} 1 & 1 & 1 & 1 \\ q_1^{2i1} & q_1^{2i1+1} & q_1^{2i1+2} & q_1^{2i1+3} \\ q_1^{2(2i1)} & q_1^{2(2i1+1)} & q_1^{2(2i1+2)} & q_1^{2(2i1+3)} \\ q_1^{3(2i1)} & q_1^{3(2i1+1)} & q_1^{3(2i1+3)} & q_1^{3(2i1+3)} \end{bmatrix} \text{ where} \quad (6)$$

$$q_1 = e^{j2\pi/32}.$$

Due to this difference, each grid of beams in the 8Tx dual codebook can be represented by one center beam direction in each grid of beams such as equation (7).

$$v(i1) = \begin{bmatrix} 1 \\ q_1^{2i1+1.5} \\ q_1^{2(2i1+1.5)} \\ q_1^{3(2i1+1.5)} \end{bmatrix} \quad (7)$$

Then when searching for i1 index for the earlier 8 Tx dual codebook, we can simply fix one co-phasing value and only search for 16 representative vectors to derive the i2 index. After the i1 index is determined, we can then determine the i2 index by searching all 16 possible $W_2(i2)$ matrices conditioned on the best i1 index. As such, one possible low complexity search algorithm only needs to search 16 vectors from a total 128 unique vectors in order to determine the best candidate precoder.

But in the newly defined LTE Release-12 4Tx dual codebook, the grid of beams defined by the W1 matrix is widely spaced to cover the full angular space. Thus the existing low complexity codebook search method for LTE 8Tx dual codebook cannot be reused for the newly defined 4Tx dual codebook because there is no center direction in each grid of beams. In the remaining discussion of a PMI based on two matrices and a 4Tx dual codebook, the term "group" or "group of beams" will be used for the term "grid" or "grid of beams." This is for clarity to distinguish this discussion from other a more general use of the term "grid" in other parts of this disclosure (such as "resource grid"). However, it will be understood by those of ordinary skill in the art that "grid of beams" is intended in the discussion.

In order to avoid brute-force searching all possible code words, we first define the representative codewords for each 2Tx constituent beam (defined below). The representative codewords are optimized for both a uniform linear array and a cross polarized antenna array. Stated another way, 4Tx uniform linear array performance is optimized while at the same time 4Tx closed spaced cross polarized array performance is not substantially degraded.

We first search for each constituent (or constituent) 2Tx beam with index k. The search for the best 2Tx constituent beam can be split into multiple stages. As used herein, "best" means based on a system evaluation metric such as, among other metrics, system throughput. In other embodiments the system evaluation metric can be the cross correlation between the representative codeword of the 2Tx constituent beam and the principal Eigen beam of the channel covariance matrix. In some embodiments a system evaluation metric may be determined by creating a mathematical model of the channel system throughput and solving the resulting equations in real time. In the first stage of the search we split the full angle span into four angle ranges and search for the center of each angle span. In the following stages we further refine the search scope of the 2Tx constituent beam within the best angle span of the previous stage. After the best 2Tx constituent beam has been determined, we then decide on the best index i1 candidates for the first matrix $W_1(i1)$ which provides the best 2Tx constituent beams. We also decide on all the possible best indexes i2 for each i1 candidate.

Because the best 2Tx constituent beam greatly reduces the search scope of the first matrix $W_1(i1)$ and the second matrix $W_2(i2)$, the overall search complexity is greatly reduced.

In the description below, the term $$2Tx \begin{bmatrix} 1 \\ q_1^{i1} \end{bmatrix}$$

will be referred to as a "2Tx constituent beam."

Thus each precoder in LTE Release 12 is indexed by two PMIs: the first $PMI^{i1}$ and the second $PMI^{i2}$. The first $PMI^{i1}$ defines a group of four beams. In one embodiment there are in total 16 groups of four beams. $PMI^{i1}$ is used to find the first matrix $W_1(i1)$. The second $PMI^{i2}$ selects one 2Tx constituent beam out of each group and rotates the second Tx constituent beam with a co-phasing term. According to equation (4), $PMI^{i2}$ has 4 bits, and 2 bits are used to select one out of four beams in one group. The remaining 2 bits are used to select one phase rotation term in the $W_2(i2)$ matrix. In one embodiment the way to evaluate one codeword versus another would use the same evaluation metric(s). Then the codeword which results in the best codeword evaluation metric(s) is selected.

A rank one codebook contains $2^{i1+i2}=256$ unique codewords. A rank two codebook contains $2^{i1+i2-1}=128$ codewords due to overlapped beams between beam group i1 and beam group (i1+8) mod 16, in which mod is the modulus operation.

Optimized Search

For aperiodical feedback mode such as PUSCH 3-2, the UE 202 sends back to the eNB 102 wideband i1 and subband i2 for each subband. The optimal search method can be described by pseudo code as:

```
capacity_wideband=0
i1_best_wideband=0
for i1=0:15
    capacity_wideband(i1)=0
    for s=1:N_subband
        capacity_subband(s)=0
        i2_best(i1, s)=0
        for i2=0:15
            if capacity_subband(s,i2)> capacity_subband(s)
                capacity_subband(s)=capacity_subband(s,i2)
                i2_best(i1, s)=i2
            end
        end
        capacity_wideband(i1)= capacity_wideband(i1)+ capacity_subband(s)
    end
    if capacity_wideband(i1)> capacity_wideband
        capacity_wideband = capacity_wideband(i1)
        i1_best_wideband =i1
    end
end
```

After the UE 202 has performed the PMI search according to the pseudo code described above, it reports best wideband i1 as "i1_best_wideband" and the best subband i2 as "i2_best(i1_best_wideband, s)" for each subband.

Simplified, Efficient Search

Although the optimum search as described above has optimum performance, the search complexity may not be affordable because all the codewords need to be searched for each subband before the optimum CSI report can be derived. A simplified, efficient codeword search algorithm below can greatly reduce the codeword search complexity. In some embodiments this can be a four-step search, described in greater detail below but set forth here in general terms. In step 1, we select representative codewords (indexed by i1 and i2) for each 2Tx constituent beam (indexed by k), where a constituent beam is defined as $$\begin{bmatrix} 1 \\ q_1^k \end{bmatrix}.$$

As can be seen in Table 1, k goes from 0 to 31. In this discussion, k represents the quantized channel direction. For example, the angle between transmitter and receiver has a full span of 360 degrees, and we can quantize 360 degrees into 32 ranges and each spans 11.25 degrees. The representative code words are chosen to provide the maximum number of 4Tx DFT vectors to optimize for 4Tx uniform linear array performance and for 4Tx closed spaced cross polarized array performance, which is a criterion discussed above. In step 2, we use hierarchical search to find the best 2Tx constituent beam. For example, we first split the 2Tx constituent beams into four spans to cover the whole (or entire) 2PI angle and search the four 2Tx constituent beam represented by k equals 3, 11, 19 and 27. These indexes are chosen in this example because a 2Tx constituent beam indexed with {3, 11, 19, 27} covers the whole angle span. If we found that the first 2Tx constituent beam (k=11) is the best, in the second step we reduce the search range to 2Tx constitution beams (k=9, 13, 15) which are closest to the 2Tx constitution beam (k=11). In this discussion "closest" means the quantized channel direction that is closest. If in the second step, we found k=11 is the best 2Tx constituent beam, we only need to search k=10 in the final, third, step. This is because k=11 is searched in previous steps, thus we only need to search k=10 and compare the results with k=11. Compared to non-hierarchical search of all 32 2Tx constituent beams, in this hierarchical search we only need to search 8 2Tx constituent beams. In step 3, search for the two i1 index corresponding to the best 2Tx constituent beam. The best 2Tx constituent beam, again, results in the best evaluation metric such as system throughput with the corresponding representative codeword indexed by i1 and i2 in steps 1 and 2. In step 4, search the best i2 index for each subband conditioned on two best i1 indexes. The best i2 index means that the corresponding codeword by the best wideband i1 index and best subband i2 index results in best evaluation metrics such as system throughput for the given subband. Below is the foregoing with additional detail with reference to Table 1 and Table 2.

Step 1: Select one codeword which could be a representative codeword for one 2Tx constituent beam $$\begin{bmatrix} 1 \\ q_1^k \end{bmatrix}$$

as in Table 1, below. Table 1 represents thirty-two 2TX constituent beams. In other words, there are four sets of (k, i1, i2) components and eight rows, giving thirty-two 2Tx constituent beams.

TABLE 1 i1 and i2 index corresponding to the 2Tx constituent beam index k

| k | i1 | i2 |
|---|----|----|
| 0 | 0 | 0 |
| 1 | 1 | 0 |
| 2 | 2 | 0 |
| 3 | 11 | 12 |
| 4 | 4 | 1 |
| 5 | 5 | 0 |
| 6 | 5 | 0 |
| 7 | 15 | 13 |
| 8 | 8 | 2 |
| 9 | 1 | 6 |
| 10 | 10 | 0 |
| 11 | 11 | 0 |
| 12 | 12 | 3 |
| 13 | 5 | 7 |
| 14 | 14 | 0 |
| 15 | 15 | 0 |
| 16 | 0 | 8 |
| 17 | 9 | 4 |
| 18 | 2 | 8 |
| 19 | 3 | 8 |
| 20 | 4 | 8 |
| 21 | 13 | 5 |
| 22 | 6 | 9 |
| 23 | 7 | 8 |
| 24 | 8 | 8 |
| 25 | 9 | 8 |
| 26 | 10 | 10 |
| 27 | 3 | 14 |
| 28 | 12 | 8 |
| 29 | 13 | 8 |
| 30 | 14 | 11 |
| 31 | 7 | 15 |

Those codewords whose i1 and i2 indexes are marked as underscored in bold font are also 4Tx DFT vectors. Thus those representative codewords are optimized for both close spaced cross polarized antenna and uniform linear arrays. The first step search applies for the whole, or entire, system bandwidth. Table 1 is optimized for a rank one codebook. For a rank two codebook, the same table can still be applied. But further optimization is possible by choosing different representative i2 indexes for each 2Tx constituent beam.

Step 2: select the best 2Tx constituent beam. The thirty-two 2Tx constituent beams can be searched in three stages, indicated below.

Stage 1 of Step 2

In the first stage of step 2, only those 2Tx constituent beam indexes k ∈{k(1)}={3, 11, 19, 27} as shown in Table 2, below, are searched because, as discussed above, the 2Tx constituent beam indexed with {3, 11, 19, 27} covers the whole angle span. The 2Tx beam index is selected to be the representative beam for each group in the first stage. One alternative to {3, 11, 19, 27} is {4, 12, 20, 28} which should result in similar performance because, similarly as {3, 11, 19, 27}, {4, 12, 20, 28} also covers the full angle span of 2PI for the 2Tx constituent beam. Both should be equivalent in terms of performance. The best 2Tx constituent beam of the first stage can be represented as k_best(1). For stage s={2,3} of step 2, only search those 2Tx constituent beam indexes if their corresponding k index in the previous stage equals to k_best(s−1).

Stage 2 and Stage 3 of Step 2

Since k_best(s−1) is also one of the candidate indexes at stage s, only three candidate k indexes need to be searched in stage 2 of step 2 and one candidate in stage 3 of step 2 because one of the candidates in step 2; for example 11 in {9, 11, 13, 15}, has already been searched in step 1. The k indexes marked as underscored in bold font in Table 2, below, represent one possible search route. In stage 1, {3, 11, 19, 27} are searched and 11 is chosen. 11 is chosen because the corresponding codeword results in best codeword search metrics such as system throughput. In stage 2, {9, 13, 15} is additionally searched and 11 is chosen because the best representative codeword corresponding to the best 2Tx constituent beam {9, 11, 13, 15} is still found to be 11. In stage 3, 10 is additionally searched and 10 is chosen. This is because the corresponding codeword for 2Tx constituent beam 10 results in better codeword metrics than 2Tx constituent beam 11. So in order to search for the best k, only 8 codewords need to be searched. The best k index is denoted as k_best which is the outcome of step 2. This approach is able to reduce the search complexity of 2Tx constituent beams by 75%. If the modem can pay for more complexity for results reliability, it can additionally search the second best route. Using the same example, the second best route may choose 19 from stage 1, search {17, 21, 23} in stage 2 and search 22 in stage 3. So four more codewords need to be searched for the second best route. Although we may pay more searching complexity for more routes, the performance of searching two routes should already be quite good and stable.

TABLE 2

K index candidates in three stages

| k(1) | k(2) | k(3) |
|------|------|------|
| 3 | 1 | 0 |
|   |   | 1 |
|   | 3 | 2 |
|   |   | 3 |
|   | 5 | 4 |
|   |   | 5 |
|   | 7 | 6 |
|   |   | 7 |
| 11 | 9 | 8 |
|   |   | 9 |
|   | 11 | 10 |
|   |   | 11 |
|   | 13 | 12 |
|   |   | 13 |
|   | 15 | 14 |
|   |   | 15 |
| 19 | 17 | 16 |
|   |   | 17 |
|   | 19 | 18 |
|   |   | 19 |
|   | 21 | 20 |
|   |   | 21 |
|   | 23 | 22 |
|   |   | 23 |
| 27 | 25 | 24 |
|   |   | 25 |
|   | 27 | 26 |
|   |   | 27 |
|   | 29 | 28 |
|   |   | 29 |
|   | 31 | 30 |
|   |   | 31 |

Step 3: select the best two i1 candidates from the best 2Tx constituent beam k. The first i1 candidate can be determined according to Table 1, "best_i1_candidate_1"=i1(k_best). The corresponding i2 index, which has been searched in step 2 according to Table 1, is: "best_i2_candidate_1"=i2 (k_best). Due to the dual codebook structure, half of the 2Tx constituent beams are overlapped between beam group i1 and beam group (i1+8) mod 16. Thus it is safer to search the second i1 group which contains the same 2Tx constituent beam as the first i1 group.

The second i1 candidate can be determined based on the first i1 candidate.

```
if best_i1_candidate_1<8
    best_i1_candidate_2= best_i1_candidate_1+8
else
    best_i1_candidate_2= best_i1_candidate_1−8
end
```

The corresponding i2 index for the second i1 candidate can be calculated by finding an i2 index best_i2 candidate_2 which can select the same best 2Tx constituent beam k_best.

Step 4: search the best two i1 candidates for all the subbands to find the best subband i2. Since each beam group i1 contains largely spaced beams, we can split the search of i2 in two stages to save search complexity. In stage 1, we can only search seven i2 candidates. The first four i2 candidates can contain the same 2Tx constituent beam as the predetermined i2 index in step 3. For 4Tx closely spaced antennas, usually the beam direction plays a more important role than co-phasing. Thus if the 2Tx constituent beam indexed is assumed to be reliable for each subband, only searching four different co-phasing of the same 2Tx wideband constituent beam would be sufficient. The remaining three candidates would contain different 2Tx constituent beams using one co-phasing term. If, in the first step, we selected any of the first four i2 candidates, we do not need to search any more i2 candidates. The search of different 2Tx constituent beams within one group for each subband is mainly for robustness so is generally not as important as searching different co-phasing terms. Otherwise, if any of the remaining three i2 candidates are selected in the first stage, we need to additionally search three i2 candidates which contain the same 2Tx constituent beam as the i2 candidate chosen in the first stage but with a different co-phasing term. So in a maximum search for one i1 index we need to search nine i2 candidates.

For a rank two codebook, the i2 search method can be designed accordingly using code such as the pseudo code below.

```
capacity_wideband=0
i1_best_wideband=0
for i1 is one of {best_i1_candidate_1, best_i1_candidate_2}
    capacity_wideband(i1)=0
    for s=1:N_subband
        capacity_subband(s)=0
        i2_best(i1, s)=0
        for i2 is one of {maximum 9 i2 candidates for rank one}
            if capacity_subband(s,i2)> capacity_subband(s)
                capacity_subband(s)=capacity_subband(s,i2)
                i2_best(i1, s)=i2
            end
        end
        capacity_wideband(i1)= capacity_wideband(i1)+ capacity_subband(s)
    end
    if capacity_wideband(i1)> capacity_wideband
        capacity_wideband = capacity_wideband(i1)
        i1_best_wideband =i1
    end
end
```

With the disclosed simplified codeword search algorithm, the search complexity is reduced from 256 codewords in the brute force search to 8+9*2=26 codewords.

Figure 5:
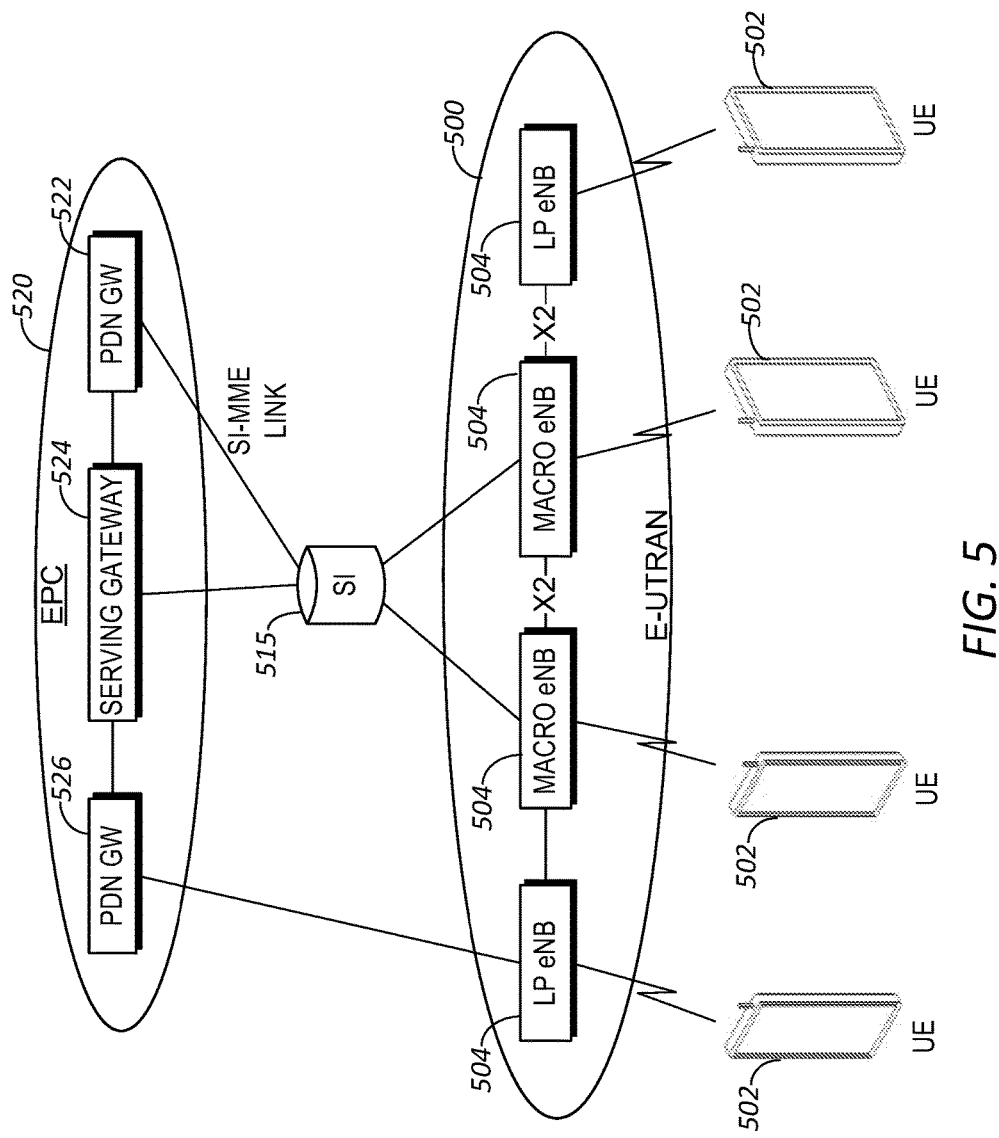
FIG. 5 is a functional diagram of a portion of an end-to-end network architecture of an LTE network in accordance with some embodiments.

FIG. 5 shows a portion of an end-to-end network architecture of an LTE network with various components of the network in accordance with some embodiments. The network comprises a radio access network (RAN) (e.g., as depicted, the E-UTRAN or evolved universal terrestrial radio access network) 500 and the core network 520 (e.g., shown as an evolved packet core (EPC)) coupled together through an S1 interface 515. For convenience and brevity sake, only a portion of the core network 520, as well as the RAN 500, is shown.

The core network 520 includes mobility management entity (MME) 522, serving gateway (serving GW) 524, and packet data network gateway (PDN GW) 526. The RAN 500 includes enhanced node Bs (eNBs) 504 (which may operate as base stations) for communicating with user equipment (UE) 502. The eNBs 504 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 524 terminates the interface toward the RAN 500, and routes data packets between the RAN 500 and the core network 520. In addition, the serving GW 524 may be a local mobility anchor point for inter-eNB handovers and also may provide an anchor for inter-3GPP mobility. Other responsibilities may include lawful intercept, charging, and some policy enforcement. The serving GW 524 and the MME 522 may be implemented in one physical node or separate physical nodes. The PDN GW 526 terminates an SGi interface toward the packet data network (PDN). The PDN GW 526 routes data packets between the core network 520 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 526 and the serving GW 524 may be implemented in one physical node or separated physical nodes.

The eNBs 504 (macro and micro) terminate the air interface protocol and may be the first point of contact for a UE 502. In some embodiments, an eNB 504 may fulfill various logical functions for the RAN 500 including but not limited to RNC (radio network controller functions) such as radio bearer management, uplink and downlink dynamic radio resource management and data packet scheduling, and mobility management. In accordance with embodiments, UEs 502 may be configured to communicate OFDM communication signals with an eNB 504 over a multicarrier communication channel in accordance with an OFDMA communication technique. The OFDM signals may comprise a plurality of orthogonal subcarriers.

The S1 interface 515 is the interface that separates the RAN 500 and the EPC 520. It is split into two parts: the S1-U, which carries traffic data between the eNBs 504 and the serving GW 524, and the S1-MME, which is a signaling interface between the eNBs 504 and the MME 522. The X2 interface is the interface between eNBs 504. The X2 interface comprises two parts, the X2-C and X2-U. The X2-C is the control plane interface between the eNBs 504, while the X2-U is the user plane interface between the eNBs 504.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 526. Similarly, a picocell is a wireless communication system typically covering a small area, such as in-building (offices, shopping malls, train stations, etc.), or more recently, in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel. The physical downlink shared channel (PDSCH) carries user data and higher-layer signaling to a UE 502 (FIG. 5). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE. The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, $L_i$=1, 2, 4, or 8).

Although the eNB 102 (FIG. 1) and the UE 202 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of the eNB 102 and the UE 202 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the eNB 102 and the UE 202 may include one or more processors and may be configured with instructions stored on a computer-readable storage device.

The above description and the drawings illustrate some embodiments to enable those skilled in the art to practice the embodiments disclosed. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description. Therefore, the scope of various embodiments disclosed is determined by the appended claims, along with the full range of equivalents to which such claims are entitled.

The Abstract is provided to comply with any regulations that might require an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Embodiments described herein may be implemented in one or a combination of hardware, firmware, and software. Embodiments described herein may also be implemented as instructions stored on a computer-readable storage medium, which may be read and executed by at least one processor to perform the operations described herein. A computer-readable storage medium may include any non-transitory or other mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of user equipment may be configured with the instructions to perform the operations described herein.

The above description and the drawings illustrate some embodiments to enable those skilled in the art to practice the embodiments disclosed. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description. Therefore, the scope of various embodiments disclosed is determined by the appended claims, along with the full range of equivalents to which such claims are entitled.

What is claimed is:

1. User Equipment (UE) comprising processing circuitry for transmitting precoding matrix indicator (PMI) components, $PMI^{i1}$ and $PMI^{i2}$, to an enhanced Node B (eNB) configured for wideband orthogonal frequency-division multiple access (OFDMA) information transmission in a plurality of subbands via a plurality of grids of two transmit antenna (2Tx) constituent beams, the processing circuitry arranged to:
   generate $PMI^{i1}$ and $PMI^{i2}$ corresponding to precoding matrices of codebook components of a 4TX dual codebook, wherein $PMI^{i1}$ and $PMI^{i2}$ respectively comprise indexes i1 and i2 for the codebook for use by a precoder at the eNB; and
   transmit to the eNB the i1 index for wideband bandwidth and the i2 index for each of a plurality of subbands of the wideband bandwidth,
   wherein
   the i1 index and the i2 index are generated by: selection of a representative codeword for a plurality of the 2TX constituent beams, to define, from the plurality of 2TX constituent beams, a 2TX constituent beam that provides an optimized system evaluation metric, and determination, from the defined 2TX constituent beam, of the i1 index for the wideband bandwidth and the i2 index for each of the plurality of subbands, and
   the plurality of 2TX constituent beams are indexed by k, where k represents quantized channel direction, and the definition of the 2TX constituent beam that provides an optimized system evaluation metric comprises determination of the k index of the 2TX constituent beam that provides the optimized system evaluation metric, and
   the quantized channel direction comprises quantization of the angle between transmitter and receiver into a plurality of ranges, and the representative code words are chosen to provide the maximum number of 4Tx Discrete Fourier Transform (DFT) vectors to optimize for 4Tx uniform linear array performance for 4Tx closed spaced cross polarized array performance.

2. The LIE of claim 1 wherein the determination, from the defined 2TX constituent beam, of the i1 index for the wideband bandwidth and of the i2 index for each of the plurality of subbands, comprises a determination of the best two i1 index candidates for $W_1(i1)$ from the defined 2TX constituent beam, and the definition of the best subband i2 index for $W_2(i2)$ from each of the best two i1 index candidates, for each of the plurality of subbands.

3. The UE of claim 2 wherein the representative codeword is selected to provide a maximum number of 4TX DFT vectors to optimize eNB information transmission for TX uniform linear array performance and for TX closed space cross polarized array performance.

4. The UE of claim 3 wherein the 2TX constituent beam that is indexed by k and that provides an optimized system evaluation metric is determined by a search of fewer than all of the plurality of 2TX constituent beams in a three-stage search.

5. The UE of claim 4 wherein the 2TX constituent beam k index for each of the plurality of 2TX constituent beams in one of the plurality of grids is searched in a first stage of the three-stage search.

6. The UE of claim 5 wherein, for stage two of the three-stage search, the 2TX constituent beam k index is searched only if the corresponding k index is associated with the defined 2TX constituent beam in stage one.

7. The UE of claim 6 wherein, for stage three of the three-stage search, the 2TX constituent beam k index is searched only if the corresponding k index is associated with the defined 2TX constituent beam in stage two.

8. The UE of claim 2 wherein half of the 2TX constituent beams in each of the plurality of grids are overlapped between beam grid (i1) and beam grid (i1+8) mod 16, and a first of the best two i1 index candidates is determined by a search of the grid (i1+8) mod 16 which contains the same 2TX constituent beam as grid (i1).

9. The UE of claim 8 wherein the second of the two best i1 index candidates is determined based on the first of the best two i1 index candidates.

10. The UE of claim 2 wherein the determination of the best subband i2 index from each of the best two i1 index candidates for all subbands comprises a two-stage search.

11. The UE of claim 2 wherein the plurality of 2TX constituent beams consists of thirty-two 2TX constituent beams.

12. The UE of claim 1 wherein the plurality of grids of 2TX constituent beams consists of sixteen grids of four 2TX constituent beams.

13. The UE of claim 1 wherein determination of a 2TX constituent beam k index that defines the 2TX constituent beam that provides an optimized evaluation metric comprises a hierarchical search of representative codewords that are chosen to provide a maximum number of 4TX DFT vectors to optimize the eNB for TX uniform linear antenna array performance and for TX closed space cross polarized antenna array performance.

14. The UE of claim 1 wherein the system evaluation metric is determined by a mathematical model of a communication channel between the eNB and the UE, and a solution of equations of the mathematical model in real time.

15. The UE of claim 1 wherein the system evaluation metric is one of system throughput or of a cross-correlation between the representative codeword of the defined 2TX constituent beam and a principal Eigen beam of a covariance matrix of a channel between the eNB and the UE.

16. The UE of claim 2 wherein the precoder is designed as the product of two matrices:

$$P(i1,i2) = W_1(i1)W_2(i2)$$

where the first matrix $W_1(i1)$ is a block diagonal matrix:

$$W_1(i1) = \begin{bmatrix} X(i1) & 0 \\ 0 & X(i1) \end{bmatrix},$$

where i1=1, 2, ..., 15 and:

$$X(i1) = \begin{bmatrix} 1 & 1 & 1 & 1 \\ q_1^{i1} & q_1^{i1+8} & q_1^{i1+16} & q_1^{i1+24} \end{bmatrix}$$

where $q_1 = e^{j2\pi/32}$, where for a rank one precoder, the second matrix $W_2(i2)$ is:

$$W_2(i2) \in \left\{ \frac{1}{2}\begin{bmatrix} Y \\ \alpha(i)Y \end{bmatrix}, \frac{1}{2}\begin{bmatrix} Y \\ j\alpha(i)Y \end{bmatrix}, \frac{1}{2}\begin{bmatrix} Y \\ -\alpha(i)Y \end{bmatrix}, \frac{1}{2}\begin{bmatrix} Y \\ -j\alpha(i)Y \end{bmatrix} \right\}$$

where $Y = e_i \in \{e_1; e_2, e_3, e_4\}$ and $\alpha(i) = q_1^{2(i-1)}$, and for a rank two precoder, the second matrix $W_2(i2)$ is:

$$W_2(i2) \in \left\{ \frac{1}{2\sqrt{2}}\begin{bmatrix} Y_1 & Y_2 \\ Y_1 & -Y_2 \end{bmatrix}, \frac{1}{2\sqrt{2}}\begin{bmatrix} Y_1 & Y_2 \\ jY_1 & -jY_2 \end{bmatrix} \right\}$$

where $(Y_1, Y_2) = (e_i, e_k) \in \{(e_1, e_1), (e_2, e_2), (e_3, e_3), (e_4, e_4), (e_1, e_2), (e_2, e_3), (e_1, e_4), (e_2, e_4)\}$.

17. A method performed by user equipment (UE) comprising:
generating a precoding matrix indicator, $PMI^{i1}$ and $PMI^{i2}$, corresponding to precoding matrices of codebook components of a 4TX dual codebook, $PMI^{i1}$ and $PMI^{i2}$ respectively comprising indexes i1 and i2 for the codebook for use by a precoder at the enhanced Node B (eNB) to precode information for wideband orthogonal frequency-division multiple access (OFDMA) transmission in a plurality of subbands via a plurality of grids of 2TX constituent beams; and
transmitting to the eNB the i1 index for wideband bandwidth and the i2 index for each subband,
wherein the i1 index and the i2 index are generated by:
selecting a representative codeword for a plurality of 2TX constituent beams, defining, from the plurality of 2TX constituent beams, the 2TX constituent beam that provides an optimized system evaluation metric, and
determining, from the defined 2TX constituent beam, i1 for the wideband bandwidth and i2 for each of the plurality of subbands, and
the plurality of 2TX constituent beams are indexed by k, where k represents quantized channel direction, and the definition of the 2TX constituent beam that provides an optimized system evaluation metric comprises determination of the k index of the 2TX constituent beam that provides the optimized system evaluation metric, and
the quantized channel direction comprises quantization of the angle between transmitter and receiver into a plurality of ranges, and the representative code words are chosen to provide the maximum number of 4Tx Discrete Fourier Transform (DFT) vectors to optimize for 4Tx uniform linear array performance for 4Tx closed spaced cross polarized array performance.

18. The method of claim 17 wherein determining, from the defined 2TX constituent beam, i1 for the wideband bandwidth and i2 for each of the plurality of subbands, comprises determining the best two i1 index candidates for W1(i1) from the defined 2TX constituent beam, and determining the best subband i2 index for W2(i2) from each of the best two i1 index candidates, for each of the plurality of subbands.

19. One or more computer-readable hardware storage device having embedded therein a set of instructions which, when executed by one or more processors of a computer, causes the computer to execute operations comprising:
generating a precoding matrix indicator, $PMI^{i1}$ and $PMI^{i2}$, corresponding to precoding matrices $W_1(i1)$ and $W_2(i2)$ of codebook components of a 4TX dual codebook, $W_1(i1)$ and $W_2(i2)$ respectively comprising indexes i1 and i2 for the codebook for use by a precoder at the enhanced Node B eNB to precode information for wideband orthogonal frequency-division multiple access (OFDMA) transmission in a plurality of subbands via a plurality of grids of 2TX constituent beams; and
transmitting to the eNB i1 for wideband bandwidth and i2 for each subband,
wherein the i1 index and i2 index are generated by:
selecting a representative codeword for a plurality of 2TX constituent beams, defining, from the plurality of 2TX constituent beams, the 2TX constituent beam that provides an optimized system evaluation metric, and determining, from the defined 2TX constituent beam, i1 for the wideband bandwidth and i2 for each of the plurality of subbands, and the plurality of 2TX constituent beams are indexed by k, where k represents quantized channel direction, and the definition of the 2TX constituent beam that provides an optimized system evaluation metric comprises determination of the k index of the 2TX constituent beam that provides the optimized system evaluation metric, and the quantized channel direction comprises quantization of the angle between transmitter and receiver into a plurality of ranges, and the representative code words are chosen to provide the maximum number of 4Tx Discrete Fourier Transform (DFT) vectors to optimize for 4Tx uniform linear array performance for 4Tx closed spaced cross polarized array performance.

20. The one or more computer-readable hardware storage device of claim 19 wherein determining, from the defined 2TX constituent beam, i1 for the wideband bandwidth and i2 for each of the plurality of subbands comprises determining the best two i1 index candidates for $W_1(i1)$ from the defined 2TX constituent beam, and determining the best subband i2 index for $W_2(i2)$ from each of the best two i1 index candidates, for each of the plurality of subbands.

21. An apparatus of an enhanced Node B (eNB) configured for multi-user multiple-input multiple output (MU-MIMO) transmission in an orthogonal frequency division multiple access (OFDMA) broadband wireless access network wherein transmission is via a plurality of grids of 2TX constituent beams in a plurality of subbands, the apparatus comprising hardware processing circuitry configured to:

compute a precoder matrix from precoding matrix indicators $PMI^{i1}$ and $PMI^{i2}$ corresponding to precoding matrices $W_1(i1)$ and $W_2(i2)$ of codebook components of a 4TX dual codebook, wherein $W_1(i1)$ and $W_2(i2)$ respectively comprise index i1 and index i2 for the codebook; and precode symbols for a MU-MEMO transmission using the precoder matrix on an OFDMA physical downlink shared channel (PDSCH), wherein the i1 index and the i2 index are generated by:
selection of a representative codeword for a plurality of 2TX constituent beams; definition, from the plurality of 2TX constituent beams, the 2TX constituent beams indexed by k, where k represents quantized channel direction, and that provides an optimized system evaluation metric; and determination, from the defined 2TX constituent beam, of the i1 index for the wideband bandwidth and the i2 index for each of the plurality of subbands, and the plurality of 2TX constituent beams are indexed by k, where k represents quantized channel direction, and the definition of the 2TX constituent beam that provides an optimized system evaluation metric comprises determination of the k index of the 2TX constituent beam that provides the optimized system evaluation metric, and the quantized channel direction comprises quantization of the angle between transmitter and receiver into a plurality of ranges, and the representative code words are chosen to provide the maximum number of 4Tx Discrete Fourier Transform (DFT) vectors to optimize for 4Tx uniform linear array performance for 4Tx closed spaced cross polarized array performance.

22. The apparatus of claim 21 wherein the first matrix $W_1(i1)$ is a block diagonal matrix:

$$W_1(i1) = \begin{bmatrix} X(i1) & 0 \\ 0 & X(i1) \end{bmatrix},$$

where i1=0, 1, 2, . . . , 15 and:

$$X(i1) = \begin{bmatrix} 1 & 1 & 1 & 1 \\ q_1^{i1} & q_1^{i1+8} & q_1^{i1+16} & q_1^{i1+24} \end{bmatrix}$$

where $q_1 = e^{j2\pi/32}$, where for a rank one precoder, the second matrix $W_2(i2)$ is:

$$W_2(i2) \in \left\{ \frac{1}{2}\begin{bmatrix} Y \\ \alpha(i)Y \end{bmatrix}, \frac{1}{2}\begin{bmatrix} Y \\ j\alpha(i)Y \end{bmatrix}, \frac{1}{2}\begin{bmatrix} Y \\ -\alpha(i)Y \end{bmatrix}, \frac{1}{2}\begin{bmatrix} Y \\ -j\alpha(i)Y \end{bmatrix} \right\}$$

where $Y = e_i \in \{e_1, e_2, e_3, e_4\}$ and $\alpha(i) = q_1^{2(i-1)}$, and for a rank two precoder, the second matrix $W_2(i2)$ is:

$$W_2(i2) \in \left\{ \frac{1}{2\sqrt{2}}\begin{bmatrix} Y_1 & Y_2 \\ Y_1 & -Y_2 \end{bmatrix}, \frac{1}{2\sqrt{2}}\begin{bmatrix} Y_1 & Y_2 \\ jY_1 & -jY_2 \end{bmatrix} \right\}$$

where $(Y_1, Y_2) = ((e_i, e_k) \in \{(e_1, e_1), (e_2, e_2), (e_3, e_3), (e_4, e_4), (e_1, e_2), (e_2, e_3), (e_1, e_4), (e_2, e_4)\}$.

* * * * *

UNITED STATES PATENT AND TRADEMARK OFFICE
CERTIFICATE OF CORRECTION

Page 1 of 2

PATENT NO. : 10,205,498 B2
APPLICATION NO. : 15/575226
DATED : February 12, 2019
INVENTOR(S) : Zhu et al.

It is certified that error appears in the above-identified patent and that said Letters Patent is hereby corrected as shown below:

On the Title Page

Item (57), in "Abstract", in Column 2, Line 10, after "a", insert --plurality of 2TX constituent beams indexed by k to define, from the--

In the Claims

In Column 16, Line 47, in Claim 2, delete "LIE" and insert --UE-- therefor

In Column 17, Line 5, in Claim 7, delete "LIE" and insert --UE-- therefor

In Column 17, Line 14, in Claim 9, delete "LIE" and insert --UE-- therefor

In Column 17, Line 23, in Claim 12, delete "LE" and insert --UE-- therefor

In Column 17, Line 26, in Claim 13, delete "LIE" and insert --UE-- therefor

In Column 17, Line 33, in Claim 14, delete "LE" and insert --UE-- therefor

In Column 17, Line 37, in Claim 15, delete "LIE" and insert --UE-- therefor

In Column 17, Line 50, in Claim 16, delete "i1=1," and insert --i1=0, 1,-- therefor In Column 17, Line 60, in Claim 16, delete "$Y=e_i \in \{e_1; e_2, e_3, e_4\}$" and insert --$Y = e_i \in \{e_1, e_2, e_3, e_4\}$-- therefor In Column 17, Line 67, in Claim 16, delete "e4." and insert --e4).-- therefor Signed and Sealed this
Thirtieth Day of July, 2019

Andrei Iancu
*Director of the United States Patent and Trademark Office*

CERTIFICATE OF CORRECTION (continued)
U.S. Pat. No. 10,205,498 B2

In Column 19, Line 40, in Claim 21, delete "MU-MEMO" and insert --MU-MIMO-- therefor In Column 19, Line 45, in Claim 21, after "beams;", insert --¶--

In Column 19, Line 49, in Claim 21, after "and", insert --¶--

In Column 20, Line 47, in Claim 22, delete "$Y_2)=((e_i,$" and insert --$Y_2)=(e_i,$-- therefor